COMBINATION PORTABLE AND STATIONARY DISK ROLLER

Filed April 24, 1953 4 Sheets-Sheet 1

Dick P. Robinson
Dick P. Robinson, Jr.
INVENTOR.

BY Clarence A. O'Brien
and Harvey B. Jacobson
Attorneys

COMBINATION PORTABLE AND STATIONARY DISK ROLLER

Filed April 24, 1953 4 Sheets-Sheet 2

Dick P. Robinson
Dick P. Robinson, Jr.
INVENTOR.

BY Clarence A. O'Brien
and Harvey B. Jacobson
Attorneys

COMBINATION PORTABLE AND STATIONARY DISK ROLLER

Filed April 24, 1953 4 Sheets-Sheet 3

Dick P. Robinson
Dick P. Robinson, Jr.
INVENTOR.

BY Clarence A. O'Brien
and Harvey B. Jacobson
Attorneys

Jan. 3, 1956 D. P. ROBINSON ET AL 2,729,121

COMBINATION PORTABLE AND STATIONARY DISK ROLLER

Filed April 24, 1953 4 Sheets-Sheet 4

Dick P. Robinson
Dick P. Robinson Jr.
INVENTOR.

BY Clarence A. O'Brien
and Harvey B. Jacobson
Attorneys

United States Patent Office 2,729,121

Patented Jan. 3, 1956

2,729,121

COMBINATION PORTABLE AND STATIONARY DISK ROLLER

Dick P. Robinson and Dick P. Robinson, Jr., Garden City, Kans.

Application April 24, 1953, Serial No. 350,968

14 Claims. (Cl. 76—89.2)

This invention relates to new and useful improvements in apparatus for grinding and/or sharpening cultivator disks and the primary object of the present invention is to provide a combination portable and stationary disk sharpener.

Another important object of the present invention is to provide a cultivator disk sharpening apparatus that may be used in conjunction with a disk unit or which may be employed for supporting and holding a single disk while sharpening the same.

Yet another object of the present invention is to provide a combination portable and stationary cultivator disk sharpener including a pair of coacting sharpening rollers with novel and improved means for selectively moving the rollers into and out of engagement with the peripheral edge of a cultivator disk.

Another object of the present invention is the provision of vertically swingable bearing units for the sharpening rollers which are operatively connected to a liquid impelling means for the purpose of retaining the bearing units relatively cool during rotation of the rollers.

Another object of the present invention is to provide a combination portable and stationary cultivator disk sharpening apparatus wherein the coacting sharpening rollers are carried by a support that is vertically rockably mounted upon a horizontally swinging subframe for the purpose of permitting the rollers to be advanced radially inwardly of the peripheral edge of a cultivator disk during the sharpening of the latter.

A further object of the present invention is to provide a main frame on which the subframe is horizontally swingably adjustably mounted to change the angle of the subframe with respect to the main frame so that the rollers are capable of being engaged with a cultivator disk at a desired angle.

A further object of the present invention is to provide a combination portable and stationary cultivator disk sharpening apparatus including a main frame having a removable wheel mount at its forward end and a vertically adjustable crazy-wheel at its rear end so that upon raising of the rear wheel and removal of the forward wheel unit, the main frame may be lowered onto guide tracks for movement into engagement with the longitudinally spaced cultivator disks of a cultivator disk unit.

A still further aim of the present invention is to provide a combination portable and stationary cultivator disk sharpening apparatus that is extremely simple and practical in construction strong and reliable in use, efficient and durable in operation, inexpensive to manufacture, and otherwise well adapted for the purposes for which the same is intended.

These together with other objects and advantages which will become subsequently apparent reside in the details of construction and operation as more fully hereinafter described and claimed, reference being had to the accompanying drawings forming a part hereof, wherein like numerals refer to like parts throughout and in which:

Figures 1, 10, 14:
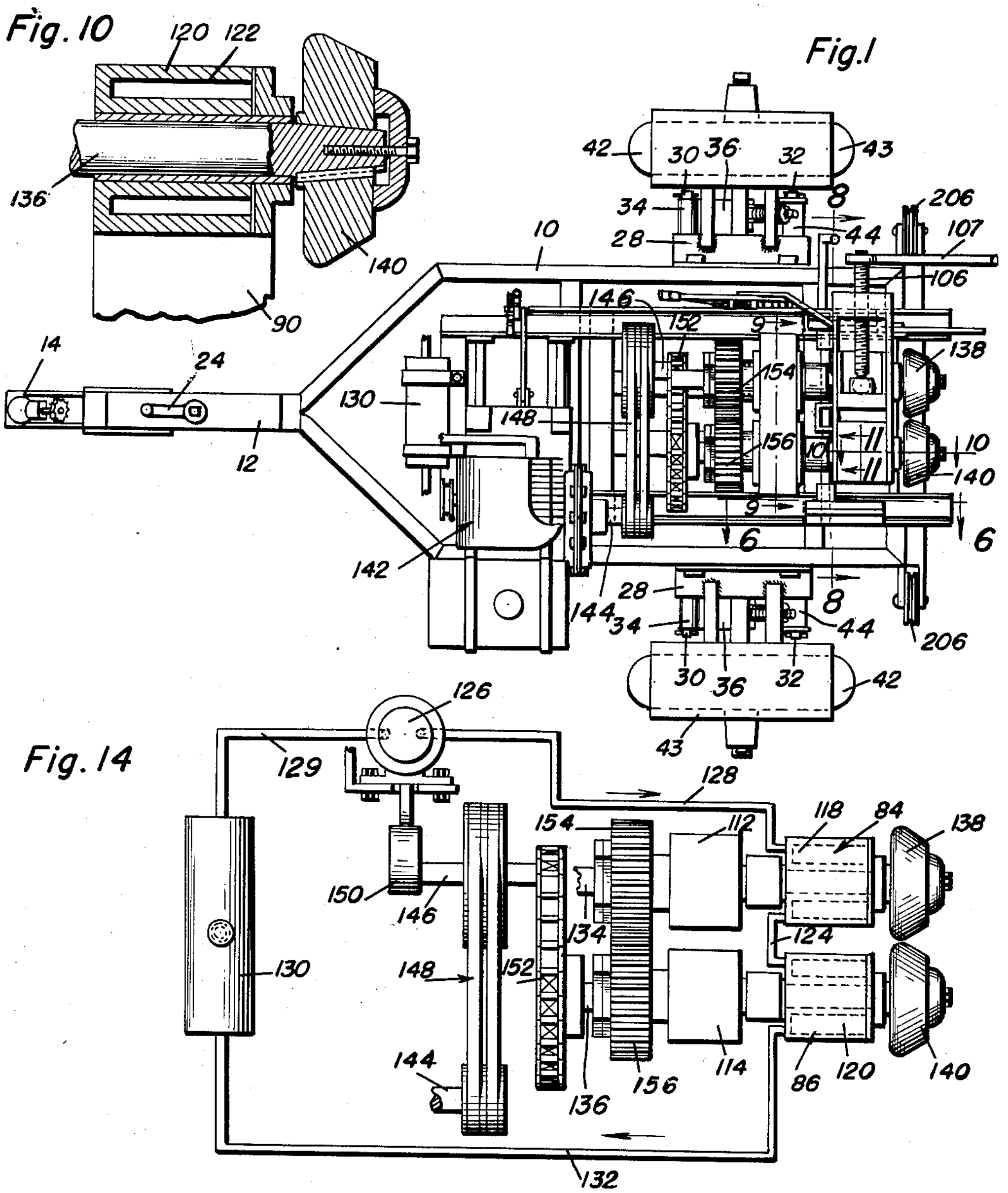
Figure 1 is a top plan view of the present invention assembled to be used for sharpening a single cultivator disk.
Figure 10 is an enlarged fragmentary longitudinal vertical sectional view taken substantially on the plane of section line 10—10 of Figure 1.
Figure 14 is a diagrammatic view illustrating the manner in which the coacting sharpening rollers are operatively connected to the power plant, and further, the fluid circulaitng means for retaining the bearing units in a relatively cool condition.

Referring now to the drawings in detail, wherein for the purpose of illustration, there is disclosed a preferred embodiment of the present invention, the numeral 10 represents a main substantially U-shaped frame having an upwardly offset rear end portion 12 that fixedly supports a hitch member 14 for swivel engagement with a ball element mountable on a towing vehicle. End portion 12 also fixedly supports an internally threaded vertical sleeve 16 that threadedly engaged a screw rod 18 whose lower end is fixed to the U-shaped mount 20 of a crazy-wheel 22. A hand grip 24 fixed to the upper end of rod 18 provides means whereby the screw rod 18 may be rotated for moving the wheel 22 toward or away from the offset end portion 12.

The forward end portion of main frame 10 removably supports a wheel mount 26 which includes a pair of angle iron mounting strips 28 that are removably bolted against and to opposite side rails of frame 10. The horizontal flanges of the strips 28 fixedly support forward and rear spaced parallel horizontal pins 30 and 32. The upper sleeve portions 34 of rigid arms 36 are swingably engaged on the pins 30 and the lower ends of the arms 36 are fixed to the end sections 38 of an axle 40 carrying ground wheels 42 which underlie fenders 43 secured to the strips 28.

Sleeves 44 are journaled on the pins 32 and fixedly support guide sleeves 46 that slidably engage connecting rods 48. The lower ends of rods 48 are pivotally attached between spaced pairs of ears 50 fixed to the axle sections 38 by horizontal bolts 52. Coil springs 54 are disposed about the rods 48 and are biased between ears 50 and sleeves 46 to yieldingly urge the axle sections 38 and more particularly the axle 40 downwardly as shown in Figure 7.

Figures 4, 5, 12, 15, 18, 19, 20:
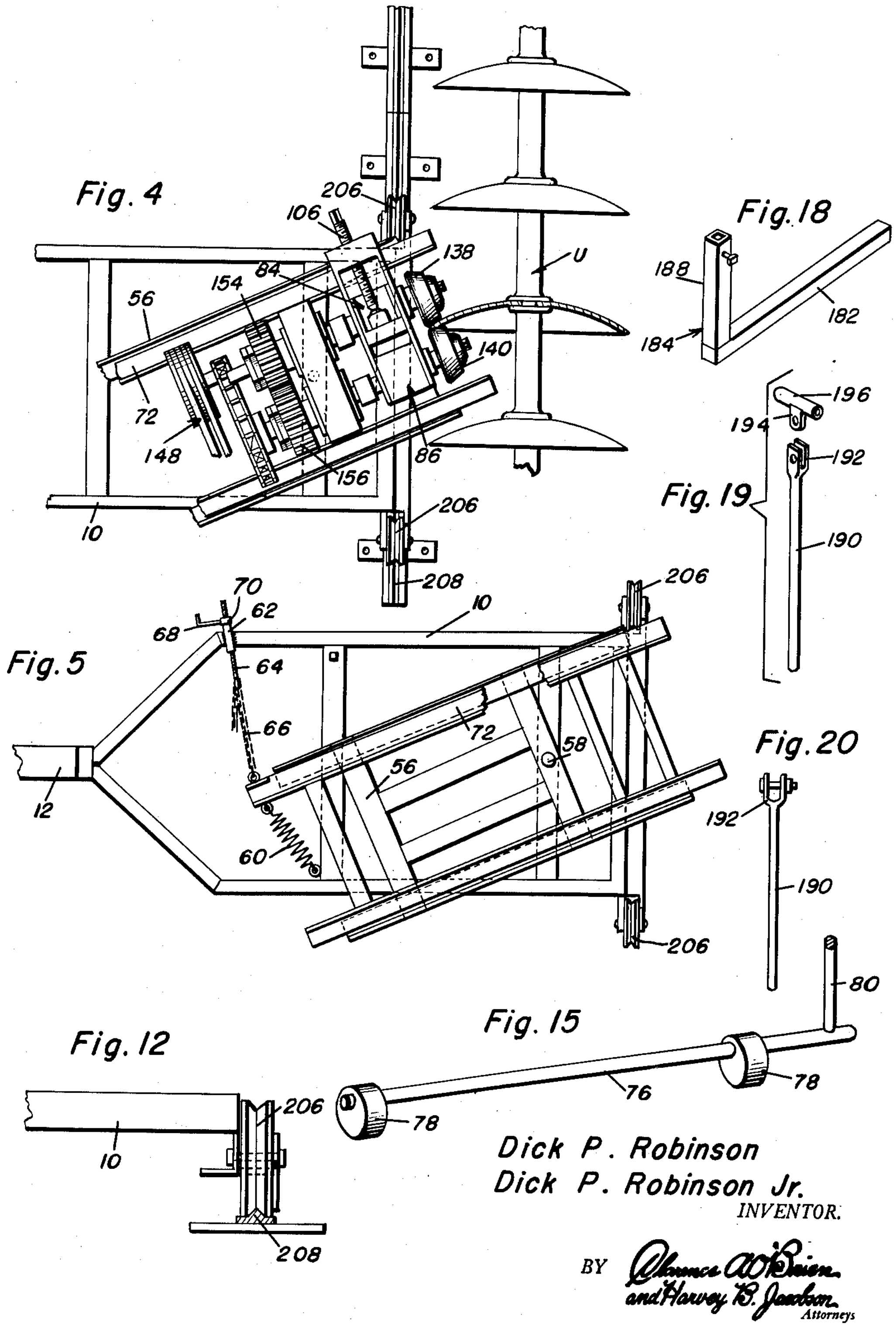
Figure 4 is a fragmentary top plan view of Figure 1 and showing the forward wheel unit removed and the main frame lowered upon supporting guide tracks which are disposed in parallel relation to a cultivator disk unit, and further, showing the subframe inclined relative to the main frame and the coacting sharpening rollers in use.
Figure 5 is a view similar to Figure 4 but showing the roller holding bearings and the power means removed from the support, and further, illustrating the means whereby the subframe is horizontally pivotally adjustably mounted with respect to the main frame.
Figure 12 is an enlarged fragmentary vertical sectional view of Figure 4 and illustrating the manner in which the main frame is slidably engaged with the guide tracks.
Figure 15 is a perspective view of the raising and lowering means for the support.
Figure 18 is a perspective view of a portion of the disk holding means which is engaged with the mount of Figure 17.
Figure 19 is a group perspective view of one of the supporting posts used in the disk holding apparatus shown in Figure 16.
Figure 20 is an elevational view of the other post used in conjunction with the disk holding apparatus of Figure 16.

A subframe 56 overlies the main frame 10 and is horizontally pivotally attached to the main frame 10 by a vertical pivot 58 (Figure 5) so that the subframe may be swung horizontally and inclined longitudinally relative to the main frame 10. The subframe 56 is connected to the main frame 10 by a coil spring 60 that yieldingly urges the subframe 56 inclined relative to the main frame 10. A horizontal sleeve 62 fixed to frame 10 slidably receives an adjusting screw 64 that is connected to the subframe 56 by a flexible element 66. A crank handle 68 is provided with a nut 70 threaded on the screw 64 and abutting the sleeve 62, whereby the screw 64 may be longitudinally adjusted in sleeve 62 for the purpose of adjusting the subframe 56 about pivot 58 in conjunction with spring 60 as shown in Figure 5.

Figures 6, 7:
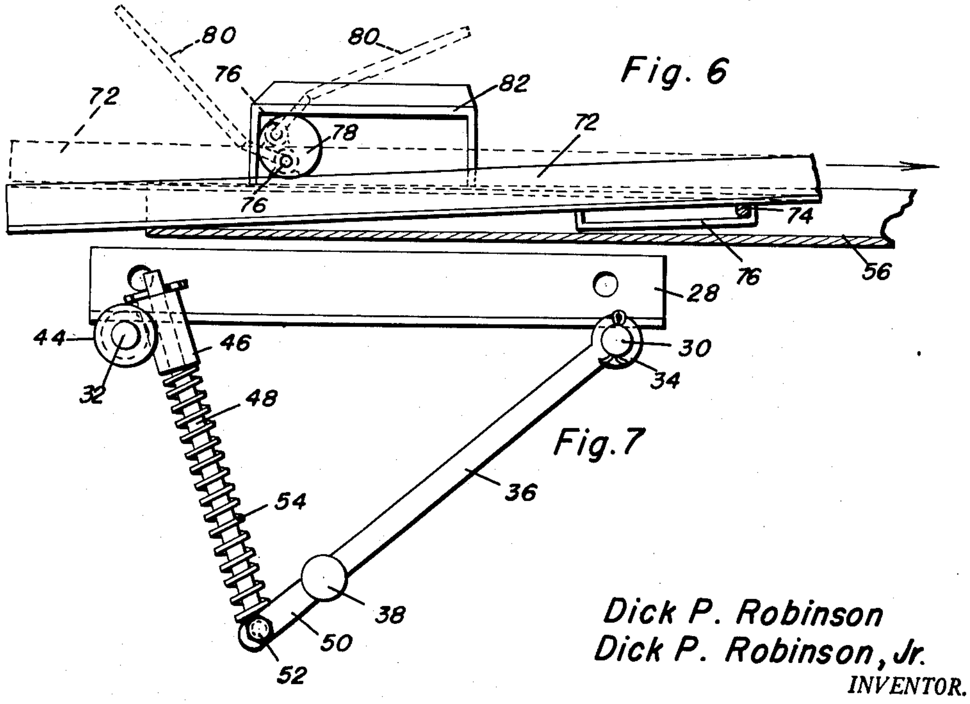
Figure 6 is an enlarged fragmentary longitudinal vertical sectional view of Figure 3 to illustrate the manner in which the support is rockably and slidably secured to the subframe.
Figure 7 is an elevational view of the forward wheel support mount used in the present invention and with the wheels removed therefrom.

Subframe 56 vertically rockably and horizontally slidably carries a support 72 through the medium of a horizontal rod 74 fixed to subframe 56 and entering the openings of U-shaped guide members 76 fixed to the underside of support 72, as shown in Figure 6. Support 72 rotatably supports a horizontally disposed transverse shaft 76 (Figure 15) having cams 78 fixed thereto and a hand lever 80 fixed to one end. The subframe 56 fixedly supports U-shaped guide brackets 82 in which the cams 78 are positioned to ride against the brackets 82 to selectively raise or lower the support 72 for a purpose presently to be described.

Figure 8:
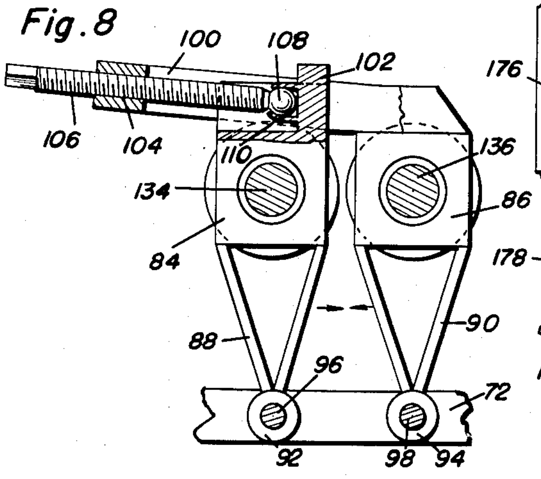
Figure 8 is an enlarged transverse vertical sectional view taken substantially on the plane of section line 8—8 of Figure 1 to illustrate the manner in which the bearing units are selectively moved toward and away from each other.

A pair of bearing units 84 and 86 (Figure 8) are provided with depending hanger portions 88 and 90 which are fixed to horizontal sleeves 92 and 94. The sleeves 92 and 94 receive horizontal pivots 96 and 98 carried by support 72 whereby the units 84 and 86 may swing vertically toward and away from each other. Means is provided for selectively moving the units 84 and 86 toward and away from each other and this means includes a rigid U-shaped member 100 fixed to unit 86 and extending over unit 84 to receive a projection 102 on unit 84. The web portion of member 100 is formed with a threaded opening 104 that receivably engages a screw threaded rod 106 having a ball element 108 that is seated in a socket 110 carried by projection 102. As rod 106 is rotated by a handle or lever 107 removably attached thereto, to move unit 86 toward unit 84, the rod 106 will push unit 84 toward unit 86, and, as rod 106 is rotated to move unit 86 away from unit 84, rod 106 will pull the unit 84 away from unit 86.

Figure 11:
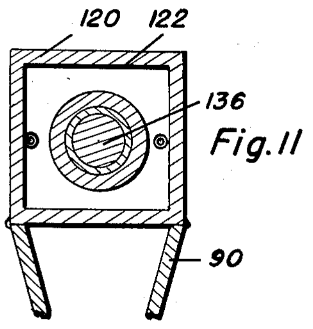
Figure 11 is a transverse vertical sectional view taken substantially on the plane of section line 11—11 of Figure 1.
Figures 2, 9:
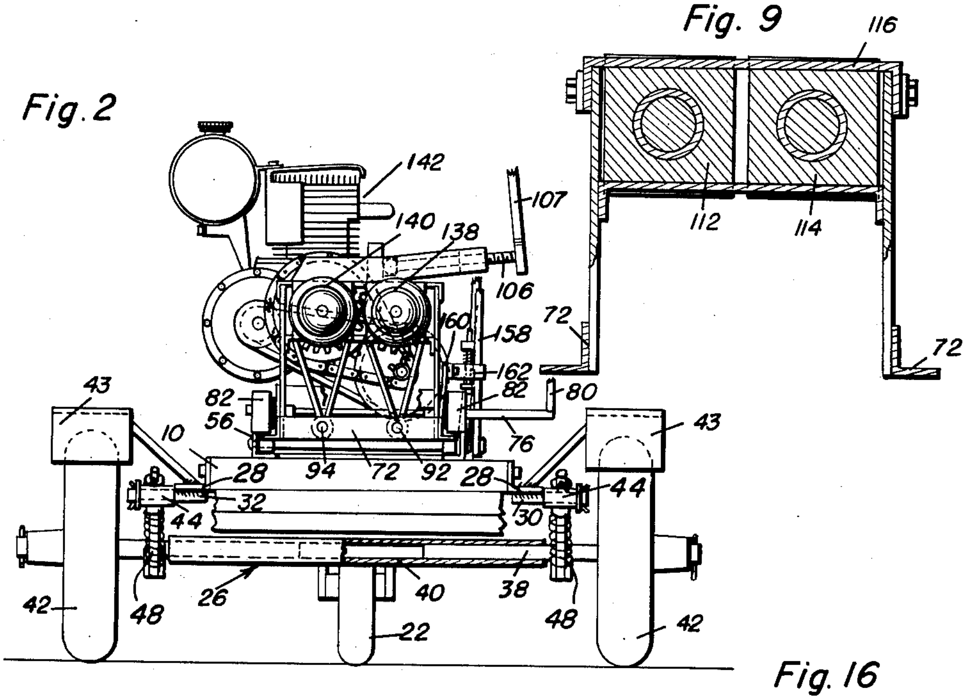
Figure 2 is a front elevational view of Figure 1.
Figure 9 is an enlarged transverse vertical sectional view taken substantially on the plane of section line 9—9 of Figure 1.

Bearing units 84 and 86 are provided with rear bearings 112 and 114 that are slidably guidingly supported by a bracket 116 (Figure 9) mounted on support 72. Units 84 and 86 are also provided with forward hollow bearings 118 and 120 each of which is provided with an annular passage 122 (Figures 10 and 11). The bearings 118 and 120 are connected by a flexible conduit 124 which communicates with the passages 122.

A pump 126 is suitably supported on the support 72 and its outlet line 128 is connected to the passage 122 of bearing 118. The intake line 129 of pump 126 is connected to a tank or reservoir 130 on support 72, which in turn is provided with an intake line 132 that extends to the passage 122 of bearing 120. In this manner, a cooling liquid directed into bearing 118 by pump 126 will pass through conduit 124 into passage 122 of bearing 120 and into line 132 for retaining bearings 118 and 120 relatively cool.

Bearings 118 and 120 rotatably support the shafts 134 and 136 of disk sharpening tapered rollers or dies 138 and 140. The rollers 138 and 140 are suitably removably secured to the forward end of shafts 134 and 136 as shown in Figure 10. The rollers or dies 138 and 140 are illustrated in the drawings as steel rollers which sharpen the disks by a swedging action, although it is to be understood that abrasive rolls formed of a material such as emery can be utilized to sharpen the disks by a grinding action.

A powerplant 142 is suitably supported on support 72 and includes a drive shaft 144 that is connected to a driven shaft 146, held by suitable bearings on support 72, by a belt and pulley drive connection 148. Shaft 146 carries a cam 150 for actuating the diaphragm of pump 126 and shaft 146 is drivingly connected to shaft 136 by a sprocket and chain drive 152.

In order that roller 138 will be driven oppositely from roller 140, the rear ends of shafts 134 and 136 fixedly support gears 154 and 156 that mesh with each other. The gears 154 and 156 will be engaged with each other although the units 84 and 86 are moved toward and away from each other slightly. This may be accomplished by the pitch of the teeth of the gears or by using shafts 134 and 136 which are composed of two sections joined by universal joints with the rear sections of the shafts journaled in bearings 112 and 114 and with the forward sections of the shafts journaled in bearings 118 and 120.

Means is provided for moving the support 72 longitudinally of the subframe 56 that the forward end of the support 72 which carries the rollers 138 and 140 may be extended forwardly from the forward end of subframe 56 and main frame 10. This means comprises a lever 158 vertically pivotally attached to the subframe 56 and connected to an arm 160 fixed to support 72 by a pitman 162. One end of the pitman 162 is formed with a plurality of longitudinally spaced apertures 164 for selectively receiving a pin 166 that pivotally attaches the pitman to arm 160.

A gear segment 168 is fixed to subframe 56 and its toothed edge is adapted to be engaged by a spring urged locking dog 170 slidably carried by lever 158, whereby the support 72 may be retained longitudinally adjusted relative to the subframe 56. A trip handle 172 pivotally attached to lever 158 is connected by a link 174 to dog 170 so that the latter may be raised from engagement with gear segment 168.

Figure 16:
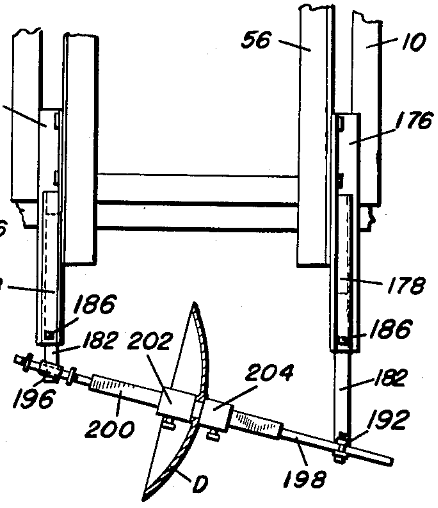
Figure 16 is a fragmentary top plan view of Figure 3 and showing the holding means applied to the support for holding a single disk in position to the apparatus to be sharpened by the coacting rollers (not shown)
Figure 13:
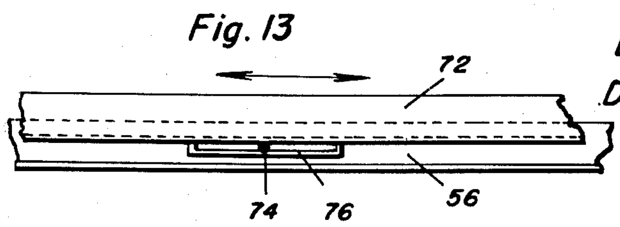
Figure 13 is an enlarged fragmentary view of Figure 6 illustrating the manner in which the support is slidably secured to the subframe.
Figures 3, 17:
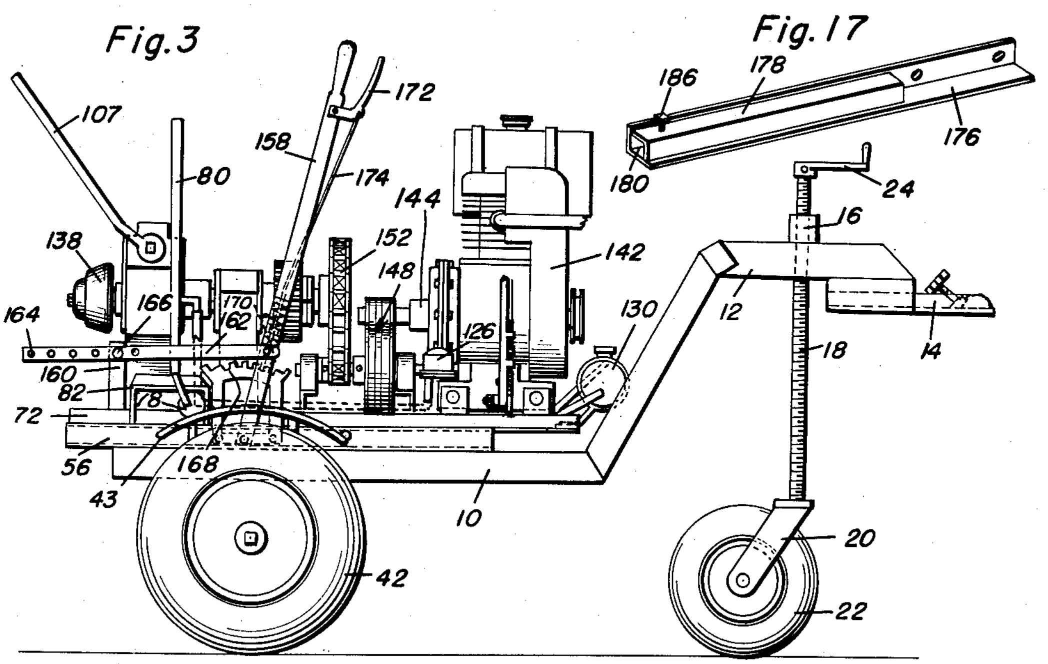
Figure 3 is a side elevational view of Figure 1.
Figure 17 is a perspective view showing the manner in which the disk holder of Figure 16 is removably secured to the support.

The apparatus thus described is capable of being used as a portable or stationary disk sharpener. When the apparatus is employed as a stationary disk sharpener means is provided for supporting or holding a disk D in position to the rollers 138 and 140 as shown in Figure 16. This means comprises a pair of angle iron members 176 (Figures 16 and 17) which are removably bolted to opposite side rails of subframe 56.

Angle iron strips 178 are fixed in facing relationship to the members 176 to define passages 180 for the horizontal leg portions 182 of L-shaped supports 184 (Figure 18). Leg portions 182 are held longitudinally adjusted in passages 180 by set screws 186 carried by strips 178. The vertical leg portions 188 of supports 184 are tubular to slidably receive the lower ends of posts 190 (Figures 19 and 20). The upper bifurcated end 192 of one of the posts 190 accommodates an ear 194 projecting laterally from a horizontal bearing sleeve 196.

The sleeve 196 on one post 190 and the bifurcated end of the other post 190 support the ends of a horizontal rotatable shaft 198 having a square central portion 200 that slidably adjustably supports a pair of square clamping collars 202 and 204 which will clamp disk D on the portion 200, as shown in Figure 16.

When the apparatus is to be used as a portable unit, the bolts securing angle iron strips 28 to the main frame are removed and the wheel mount 26 is disengaged from frame 10. The rod 18 is then rotated to move frame 10 downwardly toward wheel 22. Rollers 206 carried by the forward corners of main frame 10 engage upon rails or track 208 placed on the ground parallel to the disk unit U as shown in Figure 4. The machine is now ready to move around to the correct angle to roll the disk D and the correct angle on the disk is maintained by adjusting screw 64. The engine or power plant 142 is now ready to start. With the pressure adjusting screw 106 loosened, the rolls or rollers 138 and 140 are now moved up to the disk by means of lever 158. The machine is set in motion by pulling the clutch lever of the power plant and then pressure is applied to the screw 106 to move the rollers 138 and 140 against the disk. When the first disk is sharpened, the machine is pulled back by means of lever 158 and the entire machine is rolled down the track to the next disk and the procedure started over again.

It is preferred that the track be in two pieces laid end to end so that the track sections may be easily handled when the end of the first half of the track is reached the machine is automatically on the second half and then the first half can be laid to the end of the second half to permit the machine to travel the entire length of the unit U.

From the foregoing, the construction and operation of the device will be readily understood and further explanation is believed to be unnecessary. However, since numerous modifications and changes will readily occur to those skilled in the art, it is not desired to limit the invention to the exact construction shown and described, and accordingly all suitable modifications and equivalents may be resorted to, falling within the scope of the appended claims.

What is claimed as new is as follows:

1. A disk sharpening apparatus comprising a main frame, a subframe horizontally pivotally secured to the main frame, means operatively connecting the main frame to the subframe for horizontally adjusting the subframe relative to the main frame, a support vertically rockably secured to said subframe, means carried by said subframe and said support for selectively raising and lowering the support relative to said subframe, vertically swingable first and second bearing units carried by said support and movable selectively toward and away from each other, first and second disk sharpening rollers, each having a supporting shaft, the shaft of the first roller being rotatably supported by the first bearing unit and the shaft of the second roller being rotatably supported by the second bearing unit, means operatively connected to the shafts for rotating the same, and means operatively connecting said bearing units for selectively moving the units toward and away from each other.

2. A disk sharpening apparatus comprising a main frame, a subframe horizontally pivotally secured to the main frame, means operatively connecting the main frame to the subframe for horizontally adjusting the subframe relative to the main frame, a support vertically rockably secured to said subframe, means carried by said subframe and said support for selectively raising and lowering the support relative to said subframe, vertically swingable first and second bearing units carried by said support and movable selectively toward and away from each other, first and second disk sharpening rollers, each having a supporting shaft, the shaft of the first roller being rotatably supported by the first bearing unit and the shaft of the second roller being rotatably supported by the second bearing unit, means operatively connected to the shafts for rotating the same, and means operatively connecting said bearing units for selectively moving the units toward and away from each other, said bearing units each having a hollow front bearing, a flexible conduit connecting said front bearings and communicating with the interiors of said front bearings, means connected to one of said front bearings for directing a cooling liquid into said one bearing and hence out the other bearing through the conduit, and a return conduit extending from said other bearing to said liquid directing means.

3. A disk sharpening apparatus comprising a main frame, a subframe horizontally pivotally secured to the main frame, means operatively connecting the main frame to the subframe for horizontally adjusting the subframe relative to the main frame, a support vertically rockably secured to said subframe, means carried by said subframe and said support for selectively raising and lowering the support relative to said subframe, vertically swingable first and second bearing units carried by said support and movable selectively toward and away from each other, first and second disk sharpening rollers, each having a supporting shaft, the shaft of the first roller being rotatably supported by the first bearing unit and the shaft of the second roller being rotatably supported by the second bearing unit, means operatively connected to the shafts for rotating the same, and means operatively connecting said bearing units for selectively moving the units toward and away from each other, said means for horizontally adjusting the subframe relative to the main frame comprising a coil spring connecting the main frame to the subframe and urging the latter inclined relative to the former, an adjusting screw carried by the main frame, and a flexible connecting element between the adjusting screw and the subframe to move the subframe against action of said spring.

4. A disk sharpening apparatus comprising a main frame, a subframe horizontally pivotally secured to the main frame, means operatively connecting the main frame to the subframe for horizontally adjusting the subframe relative to the main frame, a support vertically rockably secured to said subframe, means carried by said subframe and said support for selectively raising and lowering the support relative to said subframe, vertically swingable first and second bearing units carried by said support and movable selectively toward and away from each other, first and second disk sharpening rollers, each having a supporting shaft, the shaft of the first roller being rotatably supported by the first bearing unit and the shaft of the second roller being rotatably supported by the second bearing unit, means operatively connected to the shafts for rotating the same, and means operatively connecting said bearing units for selectively moving the units toward and away from each other, said means for selectively raising and lowering the support relative to the subframe comprising a horizontally disposed transverse shaft rotatably supported by the support, cams fixed adjacent the ends of said transverse shaft, guide brackets fixed to said subframe and having openings accommodating said cams and a lever fixed to one end of said shaft for rotating the shaft to engage said cams against said brackets.

5. A disk sharpening apparatus comprising a main frame, a subframe horizontally pivotally secured to the main frame, means operatively connecting the main frame to the subframe for horizontally adjusting the subframe relative to the main frame, a support vertically rockably secured to said subframe, means carried by said subframe and said support for selectively raising and lowering the support relative to said subframe, vertically swingable first and second bearing units carried by said support and movable selectively toward and away from each other, first and second disk sharpening rollers, each having a supporting shaft, the shaft of the first roller being rotatably supported by the first bearing unit and the shaft of the second roller being rotatably supported by the second bearing unit, a power plant mounted on said support and having a drive shaft coupled to the shaft of said first roller, and meshing gears fixed on the shafts of said rollers and remaining enmeshed during relatively slight adjustment of said bearing units toward or away from each other.

6. A disk sharpening apparatus comprising a main frame, a subframe horizontally pivotally secured to the main frame, means operatively connecting the main frame to the subframe for horizontally adjusting the subframe relative to the main frame, a support vertically rockably secured to said subframe, means carried by said subframe and said support for selectively raising and lowering the support relative to said subframe, vertically swingable first and second bearing units carried by said support and movable selectively toward and away from each other, first and second disk sharpening rollers, each having a supporting shaft, the shaft of the first roller being rotatably supported by the first bearing unit and the shaft of the second roller being rotatably supported by the second bearing unit, means operatively connected to the shafts for rotating the same, and means operatively connecting said bearing units for selectively moving the units toward and away from each other, said main frame being elongated and having forward and rear end portions, a vertically adjustable crazy-wheel carried by the front end portion of said main frame and a removably mounted rear wheel mount on the rear end portion of said main frame, whereby raising of the crazy-wheel and removal of the wheel mount will permit lowering of the main frame to the ground.

7. A disk sharpening apparatus comprising a main frame, a subframe horizontally pivotally secured to the main frame, means operatively connecting the main frame to the subframe for horizontally adjusting the subframe relative to the main frame, a support vertically rockably secured to said subframe, means carried by said subframe and said support for selectively raising and lowering the support relative to said subframe, vertically swingable first and second bearing units carried by said support and movable selectively toward and away from each other, first and second disk sharpening rollers, each having a supporting shaft, the shaft of the first roller being rotatably supported by the first bearing unit and the shaft of the second roller being rotatably supported by the second bearing unit, means operatively connected to the shafts for rotating the same, and means operatively connecting said bearing units for selectively moving the units toward and away from each other, said main frame being elongated and having forward and rear end portions, a vertically adjustable crazy-wheel carried by the front end portion of said main frame and a removably mounted rear wheel mount on the rear end portion of said main frame, whereby raising of the crazy-wheel and removal of the wheel mount will permit lowering of the main frame to the ground, and track engaging rollers supported by the main frame adapted to ride upon tracks disposed against a disk unit when the wheel mount is removed to lower the main frame.

8. A disk sharpening apparatus comprising a main frame, a subframe horizontally pivotally secured to the main frame, means operatively connecting the main frame to the subframe for horizontally adjusting the subframe relative to the main frame, a support vertically rockably secured to said subframe, means carried by said subframe and said support for selectively raising and lowering the support relative to said subframe, vertically swingable first and second bearing units carried by said support and movable selectively toward and away from each other, first and second disk sharpening rollers, each having a supporting shaft, the shaft of the first roller being rotatably supported by the first bearing unit and the shaft of the second roller being rotatably supported by the second bearing unit, means operatively connected to the shafts for rotating the same, and means operatively connecting said bearing units for selectively moving the units toward and away from each other, said main frame being elongated and having forward and rear end portions, a vertically adjustable crazy-wheel carried by the front end portion of said main frame and a removably mounted rear wheel mount on the rear end portion of said main frame, whereby raising of the crazy-wheel and removal of the wheel mount will permit lowering of the main frame to the ground, and means removably supported on the support for holding a disk in position to said rollers.

9. In a disk sharpening apparatus, a main frame, a subframe horizontally pivotally attached to the main frame, a support vertically rockably attached to the subframe, a pair of coacting power driven disk sharpening rollers carried by the support, means connected to the main frame and the subframe for adjusting the subframe horizontally angularly relative to the main frame, and means carried by said support and said subframe for selectively raising and lowering the support.

10. In a disk sharpening apparatus, a pair of vertically swingable horizontal bearing units movable selectively toward and away from each other, a pair of companion power driven disk sharpening rollers having supporting shafts rotatably supported by said bearing units, and movable toward and away from each other with said bearing units, and means operatively connecting said bearing units for selectively moving the same toward and away from each other, each of said bearing units having a hollow bearing, a flexible conduit between said bearings and communicating with the interior of said bearings, a pump operatively connected to one of said bearings for directing a cooling liquid into said one bearing and through the conduit into the other bearing, and said pump having a return conduit connected to the said other bearing.

11. A disk sharpening apparatus comprising a main frame, a subframe horizontally pivotally secured to the main frame, means operatively connecting the main frame to the subframe for horizontally adjusting the subframe relative to the main frame, a support vertically rockably secured to said subframe, means carried by said subframe and said support for selectively raising and lowering the support relative to said subframe, vertically swingable first and second bearing units carried by said support and movable selectively toward and away from each other, first and second disk sharpening rollers, each having a supporting shaft, the shaft of the first roller being rotatably supported by the first bearing unit and the shaft of the second roller being rotatably supported by the second bearing unit, means operatively connected to the shafts for rotating the same, and means operatively connecting said bearing units for selectively moving the units toward and away from each other, and a removable wheel mount carried by said main frame, said wheel mount comprising a pair of angle iron mounting strips, a pair of spaced parallel horizontal pins carried by each strip, an arm horizontally swingably mounted on a pin of each strip, an axle fixed to said arms under the strips and supporting wheels, a pair of sleeves rotatable on the other pins, rods slidably engaging the sleeves and pivotally connected to the axle, and spring means engaging the rods and urging the axle downwardly from the strips.

12. In a disk sharpening apparatus, a main frame, a subframe horizontally pivotally attached to the main frame, a support vertically rockably attached to the subframe, a pair of coacting power driven disk sharpening rollers carried by the support, means connected to the main frame and the subframe for adjusting the subframe horizontally angularly relative to the main frame, and means carried by said support and said subframe for selectively raising and lowering the support, said support being longitudinally adjustable on said subframe, and adjusting means carried by said support and said subframe for selectively adjusting said support longitudinally of said subframe.

13. In a disk sharpening apparatus, a main frame, a subframe horizontally pivotally attached to the main frame, a support vertically rockably attached to the subframe, a pair of coacting power driven disk sharpening rollers carried by the support, means connected to the main frame and the subframe for adjusting the subframe horizontally angularly relative to the main frame, and means carried by said support and said subframe for selectively raising and lowering the support, said first means comprising a spring connected between one side of said main frame and said subframe, said spring urging said subframe out of longitudinal alignment with said main frame, adjusting means secured to the other side of said main frame, a flexible element interconnecting said adjusting means with said subframe, said adjusting means and said flexible element urging said subframe into longitudinal alignment with said main frame.

14. In a disk sharpening apparatus, a main frame, a subframe pivotally attached to said main frame for angular movement in a horizontal plane with respect to said main frame, a support mounted on said subframe for movement longitudinally with respect thereto, said support being vertically movable relative to said subframe, a pair of coacting power drievn disk sharpening rollers mounted on said support and movable therewith, means connected to the main frame and the subframe for adjusting the subframe horizontally angularly relative to the main frame, means carried by said support and said subframe for selectively raising and lowering the support and means carried by the support and the subframe for moving said support longitudinally relative to said subframe.

References Cited in the file of this patent

UNITED STATES PATENTS

| | | |
|---|---|---|
| 249,746 | Duff | Nov. 22, 1881 |
| 728,379 | Ditson | May 19, 1903 |
| 929,904 | Ware | Aug. 3, 1909 |
| 1,004,817 | Quiry | Oct. 3, 1911 |
| 1,051,646 | Stukart | Jan. 28, 1913 |